(12) United States Patent
Kobayashi et al.

(10) Patent No.: US 11,499,989 B2
(45) Date of Patent: *Nov. 15, 2022

(54) SURFACE ANALYSIS DEVICE

(71) Applicant: Shimadzu Corporation, Kyoto (JP)

(72) Inventors: Kanji Kobayashi, Kyoto (JP); Masato Hirade, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/283,886

(22) PCT Filed: Oct. 11, 2019

(86) PCT No.: PCT/JP2019/040220
§ 371 (c)(1),
(2) Date: Apr. 8, 2021

(87) PCT Pub. No.: WO2020/080290
PCT Pub. Date: Apr. 23, 2020

(65) Prior Publication Data
US 2021/0349125 A1 Nov. 11, 2021

(30) Foreign Application Priority Data
Oct. 16, 2018 (JP) .............................. JP2018-195154

(51) Int. Cl.
*G01Q 30/20* (2010.01)
*G01Q 10/02* (2010.01)
*G01Q 70/02* (2010.01)
(52) U.S. Cl.
CPC ............. *G01Q 30/20* (2013.01); *G01Q 10/02* (2013.01); *G01Q 70/02* (2013.01)

(58) Field of Classification Search
CPC ......... G01Q 30/20; G01Q 10/02; G01Q 70/02
(Continued)

(56) References Cited

U.S. PATENT DOCUMENTS 5,461,605 A 10/1995 Takimoto et al.
10,996,238 B2 * 5/2021 Fujino .................. G01Q 10/045
(Continued)

FOREIGN PATENT DOCUMENTS

JP 03-252502 A 11/1991
JP H05-192783 A 8/1993
(Continued)

OTHER PUBLICATIONS

Written Opinion for PCT application No. PCT/JP2019/040220 dated Nov. 19, 2019, submitted with a machine translation.
(Continued)

*Primary Examiner* — Nicole M Ippolito
(74) *Attorney, Agent, or Firm* — Muir Patent Law, PLLC

(57) ABSTRACT

A surface analysis device is provided with a sample stage for placing a sample thereon, a cantilever to be arranged to face the sample stage, and a cantilever drive unit for driving the cantilever. The drive mechanism is configured, when taking out the sample stage, to shift the sample stage relative to a measurement unit so that the measurement unit and the sample stage separate from each other in a first direction in which the cantilever and the sample stage face each other, and then slidably move the stage in a direction intersecting with the first direction.

7 Claims, 11 Drawing Sheets

(58) Field of Classification Search
 USPC .......... 850/18; 250/440.11, 441.11, 442.11, 250/443.1
 See application file for complete search history.

(56) References Cited

U.S. PATENT DOCUMENTS

2008/0017809 A1   1/2008   Hattori et al.
2014/0113828 A1   4/2014   Gilbert et al.

FOREIGN PATENT DOCUMENTS

| JP | 08-035972 A | 2/1996 |
| JP | 08-101219 A | 4/1996 |
| JP | 2001-340984 A | 12/2001 |
| JP | 2006-017638 A | 1/2006 |
| JP | 2009-103776 A | 5/2009 |
| JP | 2009-188128 A | 8/2009 |
| JP | 2014-044144 A | 3/2014 |
| WO | 08-035972 A1 | 2/1996 |

OTHER PUBLICATIONS

Office Action from the Chinese Intellectual Property Office corresponding Patent Application No. CN 201910984278.X dated Jan. 28, 2022.
Notice of Reasons for Refusal for corresponding Japanese Patent Application No. JP 2019-072088, dated Aug. 19, 2019, submitted with a machine translation.
Second Office Action from the Chinese Intellectual Property Office for corresponding application No. CN 201910984278.X, dated Aug. 19, 2022.

* cited by examiner

SURFACE ANALYSIS DEVICE

TECHNICAL FIELD

The present invention relates to a surface analysis device.

BACKGROUND ART

As a conventional analysis device, a scanning probe microscope for analyzing a microstructure on a sample surface using a cantilever provided with a probe is disclosed in Japanese Unexamined Patent Application Publication No. H08-101219 (Patent Document 1).

In the scanning probe microscope disclosed in Patent Document 1, a measurement unit including an optical system is movably fixed to a base which is fixed in a predetermined positional relation with respect to a sample stage. The measurement unit is arranged above the sample stage. When measuring a sample, the measurement unit is retracted from the position at the time of measurement to form a space for exchanging the sample above the measurement unit. With this, the replacement operation of the sample can be easily performed.

PRIOR ART DOCUMENT

Patent Document

Patent Document 1: Japanese Unexamined Patent Application Publication No. H08-101219

SUMMARY OF THE INVENTION

Problems to be Solved by the Invention

However, in the configuration disclosed in Patent Document 1, when replacing a sample, the measurement unit including the optical system is moved with the sample stage fixed. Therefore, there is a concern that the operator's hand touches the adjustment knob of the optical system unintentionally or an impact is transmitted to the optical system to cause a shift of the optical axis in the optical system.

Further, when replacing the sample, it becomes possible to move the sample after the cantilever is moved in the measurement unit. The process of moving the cantilever requires time and labor, and therefore there is a concern that it may take time and labor for the entire operation of replacing the sample.

The present invention has been made in view of the above problems, and it is an object of the present invention to provide a surface analysis device capable of easily taking out a sample.

Means for Solving the Problem

A surface analysis device based on the present disclosure is a surface analysis device for analyzing a sample surface, include a sample stage configured to place a sample thereon, a measurement unit including a cantilever to be arranged to face the sample stage and a cantilever drive unit for driving the cantilever, and a drive mechanism configured to relatively displace the measurement unit and the sample stage. The drive mechanism is configured, when taking out the sample stage, to shift the sample stage relative to the measurement unit so that the measurement unit and the sample stage separate from each other in a first direction in which the cantilever and the sample stage face each other, and then slidably move the sample stage in a second direction intersecting with the first direction.

According to the above-described configuration, when taking out the sample, the sample stage is displaced relative to the measurement unit so that the measurement unit and the sample stage are separated from each other in a first direction in which the cantilever and the sample stage oppose face each other, and then the sample stage is slidably moved in a second direction intersecting with the first direction. Therefore, when the sample stage is slidably moved, since the sample stage moves in a state in which it is apart from the measurement unit, it is possible to prevent the interference between the measurement unit and the sample stage. Further, the sample can be taken out by relatively displacing the measurement unit and the sample stage as described above without waiting for the movement of the cantilever by the cantilever drive unit in the measurement unit. Therefore, it takes no time and labor for the sample replacement, which enables an easy replacement.

According to the surface analysis device based on the present disclosure, preferably, the drive mechanism includes a sample stage holding unit for holding the sample stage and a moving mechanism for moving the sample stage between a measurement position and a sample take-out position. The first direction may be a vertical direction. In this case, preferably, the moving mechanism is configured to lift and lower the sample stage holding unit so that the sample stage is lifted and lowered between the measurement position and a retracted position positioned lower than the measurement position and slidably move the sample stage holding unit so that the sample stage is moved between the sample take-out position and the retracted position.

According to the above-described configuration, when taking out the sample, the sample stage is retracted downward with respect to the measurement unit, and then the sample stage is slidably moved. On the other hand, when setting the sample, the reverse operation is performed. For this reason, when the sample stage is slidably moved, the sample stage moves down in a state in which the sample stage is lowered with respect to the measurement unit. Therefore, it is possible to prevent the interference between the measurement unit and the sample stage.

Further, it is possible to move the sample stage between the measurement position and the sample take-out position by moving the sample stage holding unit without moving the measurement unit. Therefore, as compared with the configuration in which the measurement unit is moved to take out the sample and the configuration in which the measurement unit is removed to take out the sample, it is possible to suppress the fluctuation of the position of the measuring instrument included in the measurement unit. Further, since the operation of removing the measurement unit is not necessary, the work load and the work time for taking out the sample can be reduced. In addition, by providing the sample take-out position at a position which does not overlap with the measurement unit in the vertical direction, a sufficient work space can be secured, so that the workability can be improved.

According to the surface analysis device based on the above-described disclosure, preferably, the moving mechanism includes a support for supporting the sample stage holding unit, a slide mechanism for slidably moving the support along a slide direction in which the sample stage holding unit is slidably moved, and a lifting and lowering mechanism for lifting and lowering the sample stage holding unit relative to the support. In this case, preferably the support is movably provided in a predetermined slide section including a first section and a second section, the first section and the second section being continuous. Further, preferably, the sample stage holding unit is lifted and lowered with respect to the support by the lifting and lowering mechanism in conjunction with a slide movement of the support in the first section. Preferably, the sample stage holding unit is slidably moved along the slide direction together with the support in accordance with a slide movement of the support in the second section.

According to the above-described configuration, it is possible to swith the lifting and lowering movement and the slide movement of the sample stage holding unit in the slide section of the support. Since the sample stage holding unit can be appropriately moved by continuously slidably moving the support in the predetermined slide section, the operation can be easily controlled.

In the surface analysis device based on the above-described disclosure, the lifting and lowering mechanism may include a connecting member for connecting the support and the sample stage holding unit, and a lifting and lowering guide for guiding a movement of the sample stage holding unit in a lifting and lowering direction. In this case, preferably, one end side of the connecting member is pivotally supported by the support so that the connecting member is rotatable about a first rotation axis perpendicular to the slide direction and the lifting and lowering direction, and the other end side of the connecting member is pivotally supported by the sample stage holding unit so that the connecting member is rotatable about a second rotation axis parallel to the first rotation axis. The lifting and lowing guide preferably restricts a movement of the sample stage holding unit in a retracting direction from the sample take-out position toward the retracted position when the support is moved in the first section. Further, preferably, the support is slidably moved in the first section in a regulated state in which the movement of the sample stage holding unit in the retracting direction by the lifting and lowering guide to rotate the connecting member about the first rotation axis and the second rotation axis, thereby lifting and lowering the sample stage holding unit relative to the support.

According to the above-described configuration, one end side of the connecting member is pivotally supported by the support so as to be rotatable about the first rotation axis perpendicular to the lifting and lowering direction, and the other end side of the connecting member is pivotally supported by the sample stage holding unit so as to be rotatable about the second rotation axis parallel to the first rotation axis. By slidably moving the support while restricting the movement of the sample stage holding unit in the retracting direction, the connecting member rotates about the first rotation axis and the second rotation axis so that the inclination angle of the connecting member relative to the support changes. With this, the sample holding unit lifts and lowers the sample stage holding unit. Thus, the sample stage holding unit is lifted and lowered using the connecting member axially supported so that the posture can be changed, and therefore the lifting and lowering mechanism can be simplified.

In the surface analysis device based on the present disclosure, the lifting and lowing guide may include a roller rotatable about a rotation shaft parallel to the first rotation axis. In this case, preferably, the sample stage holding unit comes into contact with the roller to cause the regulated state, and the roller rotates in the regulated state to guide lifting and lowering of the sample stage holding unit.

According to the above-described configuration, the roller rotates when the sample stage holding unit is lifted or lowered, so that it is possible to reduce the friction between the lifting and lowering guide and the sample stage holding unit In the surface analysis device based on the present disclosure, the lifting and lowering mechanism may include a plate unit arranged above the sample stage holding unit so as not to interfere with the sample stage, and the support may be arranged below the sample stage holding unit. In this case, preferably, when the sample stage holding unit comes into contact with the plate unit, lifting of the sample stage holding unit is regulated. Further, when the sample stage holding unit comes into contact with the support, preferably the lowering of the sample stage holding unit is regulated.

According to the above-described configuration, it is possible to regulate the upward movement of the sample stage holding unit by the plate unit arranged above the sample stage holding unit while regulating the downward movement of the sample stage holding unit by the support. For this reason, it is possible to limit the lifting and lowering range of the sample stage holding unit with a simple configuration while reducing the number of components.

In the surface analysis device based on the present disclosure, the surface analysis device may further include a detection device configured to detect a position of the support. In this case, the detection device preferably includes a light-emitting unit and a light-receiving unit for receiving light emitted from the light-emitting unit. The slide mechanism preferably includes a light-shielding member that is slidably moved in accordance with the slide movement of the support. Further, preferably, the detection device detects a position of the support when the light emitted from the light-emitting unit toward the light-receiving unit is shielded by the light-shielding member.

According to the above-described configuration, the position of the support can be detected when the light emitted from the light-emitting unit to the light-receiving unit is shielded by the light-shielding member by using the detection device including the light-emitting unit and the light-receiving unit.

In the surface analysis device based on the present disclosure, the surface analysis device preferably further includes a housing configured to accommodate the sample stage, the sample stage holding unit, and the moving mechanism in a state in which the sample stage is positioned at the measurement position. Further, a part of the housing is preferably configured to be slidable. In this case, the sample stage holding unit preferably includes an engaging portion capable of being releasably engaged with the part of the housing. Further, preferably, the engaging portion is in a non-engaged state in which the engaging portion is not engaged with the part of the housing in a state in which the sample stage holding unit is lifted so that the sample stage is positioned at the measurement position, and is in an engaged state in which the engaging portion is engaged with the part of the housing in a state in which the sample stage holding unit is lowered so that the sample stage is positioned at the retracted position. Further, preferably, in the engaged state, when the sample stage holding unit is slidably moved so that the sample stage is moved from the retracted position to the sample take-out position, the part of the housing is slidably moved integrally with the sample stage holding unit to expose the sample stage to an outside from an inside of the housing.

According to the above-described configuration, a part of the housing can also be slidably moved in accordance with the slide movement of the sample stage holding unit. When the sample stage holding unit is slidably moved so that the sample stage is positioned at the sample take-out position, the sample stage is exposed from the inside of the housing to the outside, so that the sample can be easily taken out.

Effects of the Invention

According to the present invention, it is possible to provide a surface analysis device capable of easily taking out a sample.

EMBODIMENTS FOR CARRYING OUT THE INVENTION

Figure 1:
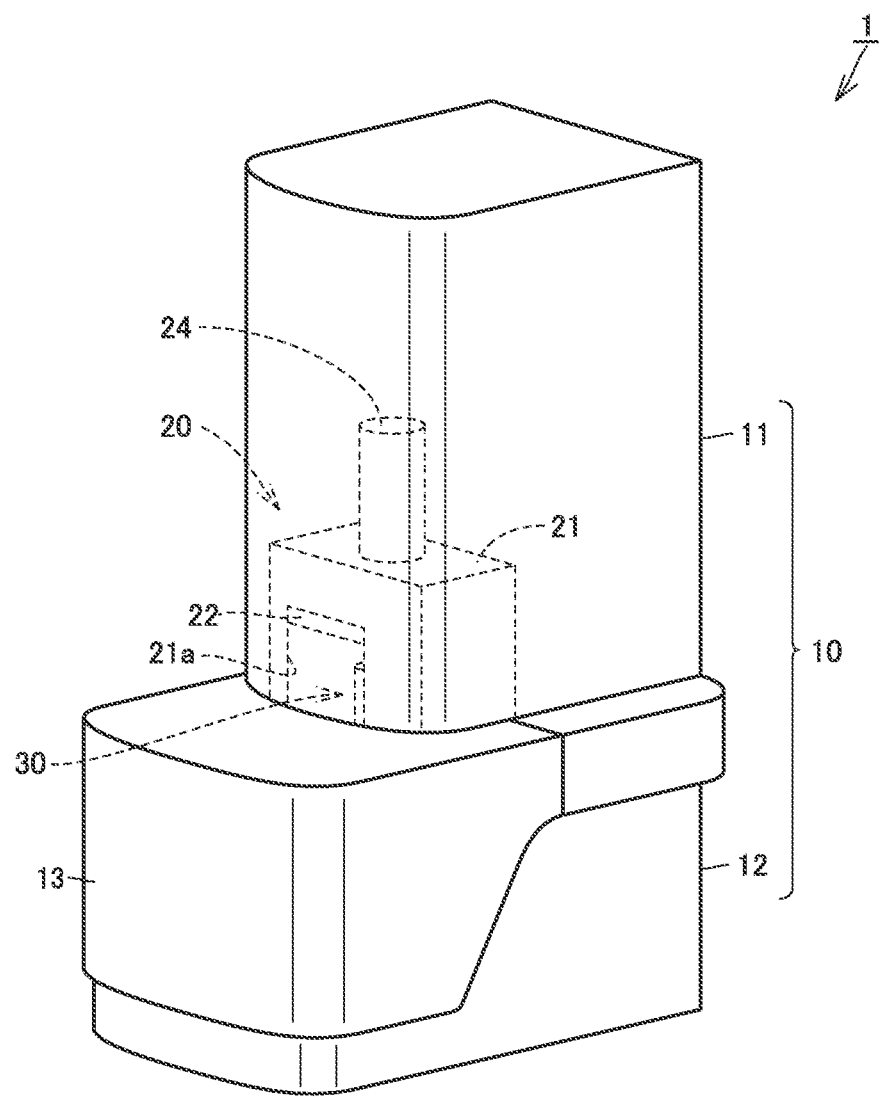
FIG. 1 is a perspective view showing a state of a scanning probe microscope at the time of measurement according to an embodiment.

Hereinafter, embodiments of the present invention will be described in detail with reference to the drawings. In the embodiment described below, a scanning probe microscope will be exemplified as a surface analysis device. Note that in the following embodiments, the same or common parts are denoted by the same reference numerals in the drawings, and the description thereof will not be repeated.

Figure 2:
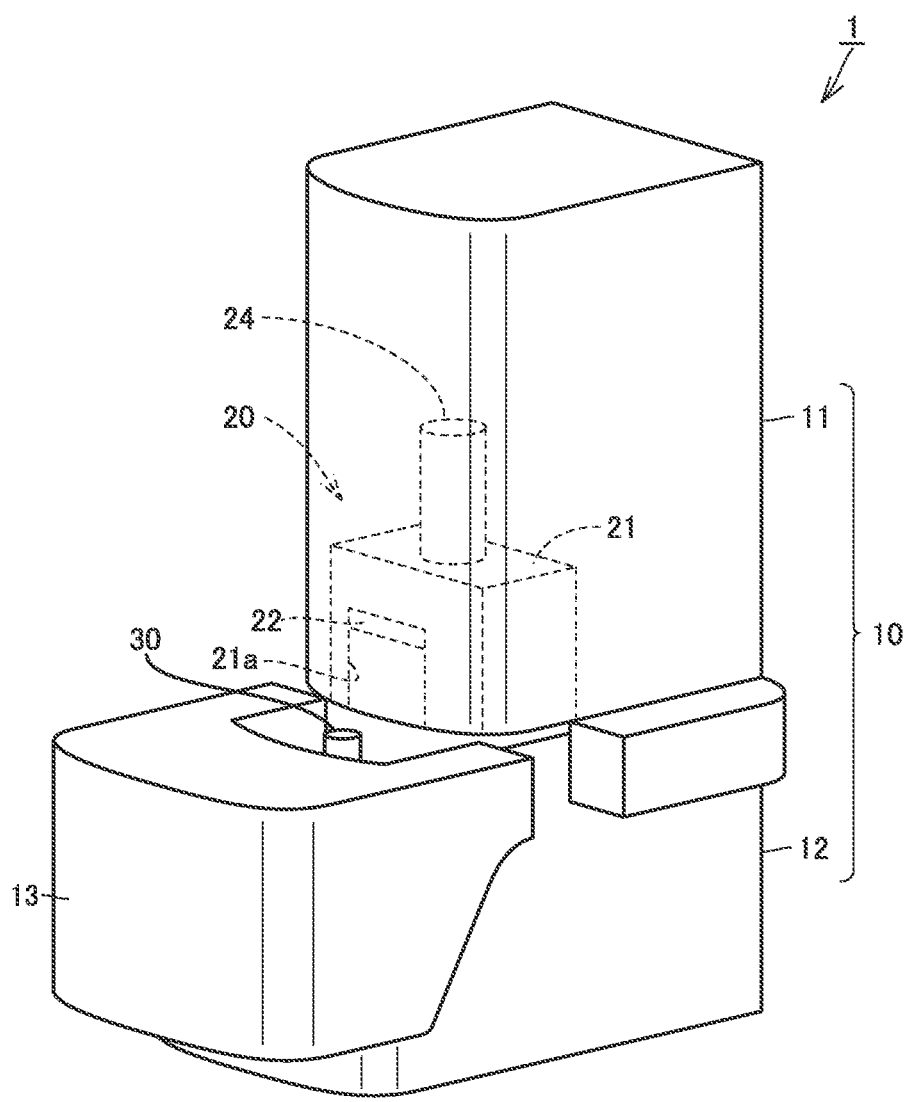
FIG. 2 is a perspective view showing the scanning probe microscope according to the embodiment when the sample is taken out.

FIG. 1 is a perspective view showing a state of the probe microscope at the time of measurement according to the embodiment. FIG. 2 is a perspective view showing the scanning probe microscope according to the embodiment when sample is taken out. Referring to FIG. 1 and FIG. 2, the scanning probe microscope 1 according to the embodiment will be described.

As shown in FIG. 1, the scanning probe microscope 1 according to the first embodiment is provided with a housing 10, a measurement unit 20, and a sample stage 30. The housing 10 includes an upper housing 11 and a lower housing 12. The upper housing 11 accommodates the measurement unit 20 therein. The lower housing 12 is positioned on the lower side of the upper housing 11. The front portion 13 of the lower housing 12 is configured to be slidably moved in the front-rear direction as a second direction.

The measurement unit 20 measures a sample from above the sample placed on the sample stage 30 positioned at a measurement position to be described later. The measurement unit 20 includes a head portion 21, a holder 22, a cantilever 23 (see FIG. 4), a cantilever drive unit 26, and an imaging unit 24. The head portion 21 has an opening 21a which opens toward the front. The holder 22 is arranged in the opening 21a. The cantilever 23 is mounted using the holder 22. The cantilever 23 is arranged so as to face the sample stage 30. The cantilever 23 is arranged above the sample stage 30. The cantilever drive unit 26 drives the cantilever.

Inside the head portion 21, a displacement detecting system is accommodated. The displacement detecting system includes a laser diode that outputs a laser beam, an optical system, such as, e.g., a lens and a mirror that guides the laser beam to the sample, a beam splitter, and a photodetector that receives the reflected light from the cantilever. Further, the head portion 21 is provided with a position adjusting knob or the like for performing the position adjustment of each component of the displacement detecting system.

The top board of the head portion 21 is provided with a window. The imaging unit 24 is used to supplementarily observe the surface of the sample through the window. The imaging unit 24 is also used to adjust the position of the displacement detecting system while observing the rear surface (upper surface) of the cantilever 23.

The sample stage 30 is a site for placing the sample. The sample stage 30 has a substantially cylindrical shape. The sample stage 30 is configured to be movable between the measurement position and the sample take-out position, as will be described later.

As shown in FIG. 1, the sample stage 30 is positioned at the measurement position at the time of the measurement and is accommodated in the housing 10. As shown in FIG. 2, the sample stage 30 is positioned at the sample take-out position when removing the sample. The sample take-out position is positioned on the below side and the forward side of the measurement position. At the time of the sample removal, the sample stage 30 is pulled forward integrally with the front portion 13 of the lower housing 12, and is exposed outward from the inside of the housing 10. For this reason, at the sample take-out position, the sample can be taken out or replaced. Furthermore, by providing the sample take-out position at a position that does not overlap with the measurement unit 20 in the vertical direction, it is possible to secure a sufficiently working space, so that it is possible to improve the workability.

Figure 3:
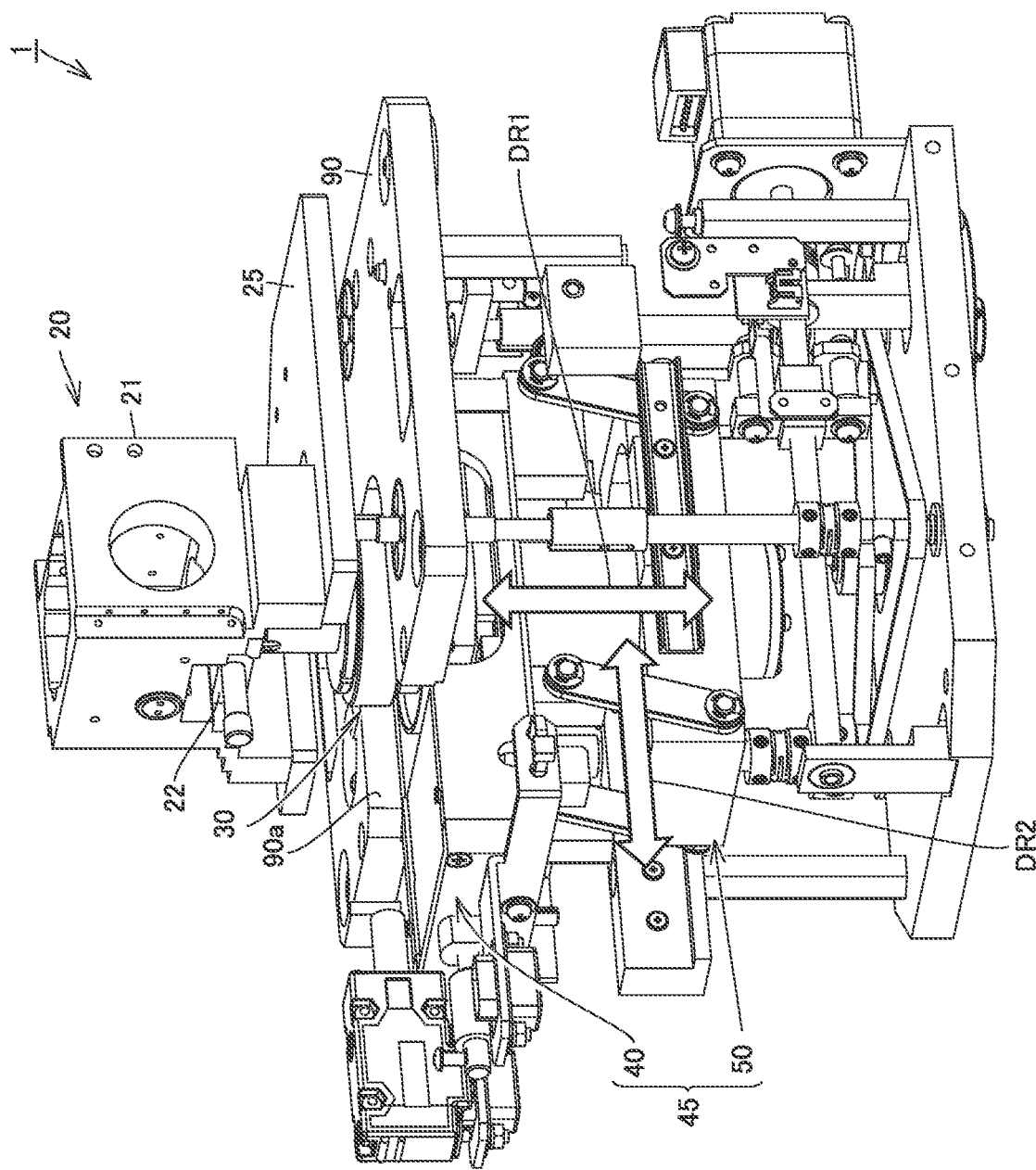
FIG. 3 is a perspective view partially showing the configuration in the housing of the scanning probe microscope according to the embodiment.

FIG. 3 is a perspective view partially illustrating the configuration in the housing of the scanning probe microscope according to the embodiment. Note that FIG. 3 shows a state at the time of measurement. Referring to FIG. 3, the configuration of the scanning probe microscope 1 in the housing 10 will be described.

As shown in FIG. 3, the scanning probe microscope 1 is further provided with a base unit 25, a plate unit 90, and a drive mechanism 45. The drive mechanism 45 includes a sample stage holding unit 40 that holds the sample stage 30 and a moving mechanism 50 for moving the sample stage 30 between the measurement position and the sample take-out position.

The base unit 25 supports the head portion 21. The base unit 25 has a cut-out portion which opens toward the front and is provided so as not to interfere with the sample stage 30.

The plate unit 90 is arranged below the base unit 25. The plate unit 90 is arranged above the sample stage holding unit 40. The plate unit 90 has a cut-out portion 90a that opens toward the front and is provided so as not to interfere with the sample stage 30.

The sample stage holding unit 40 holds the sample stage 30. With this, the sample stage 30 moves together with the sample stage holding unit 40 by moving the sample stage holding unit 40 as described later.

The drive mechanism 45 relatively displaces the measurement unit 20 and the sample stage 30. The drive mechanism 45 is configured such that when taking out the sample stage 30, the sample stage 30 is relatively displaced so that the measurement unit 20 and the sample stage 30 are apart from each other in a first direction (vertical direction) in which the cantilever 23 and the sample stage 30 face each other, and then the sample stage 30 is slidably moved in a second direction (front-rear direction) intersecting with the first direction.

Specifically, the moving mechanism 50 moves the sample stage holding unit 40 so that the sample stage 30 moves between the measurement position and the sample take-out position. The moving mechanism 50 lifts or lowers the sample stage holding unit 40 in the vertical direction (in the arrow DR1 direction) so that the sample stage 30 is lifted and lowered between the retracted position positioned below the measurement position and the measurement position. The moving mechanism 50 moves the sample stage holding unit 40 in the front-back direction (arrow DR2 direction) so that the sample stage 30 moves between the sample take-out position and the retracted position. Note that the detailed configuration of the moving mechanism 50 will be described later with reference to FIG. 7 to FIG. 9.

Figure 4:
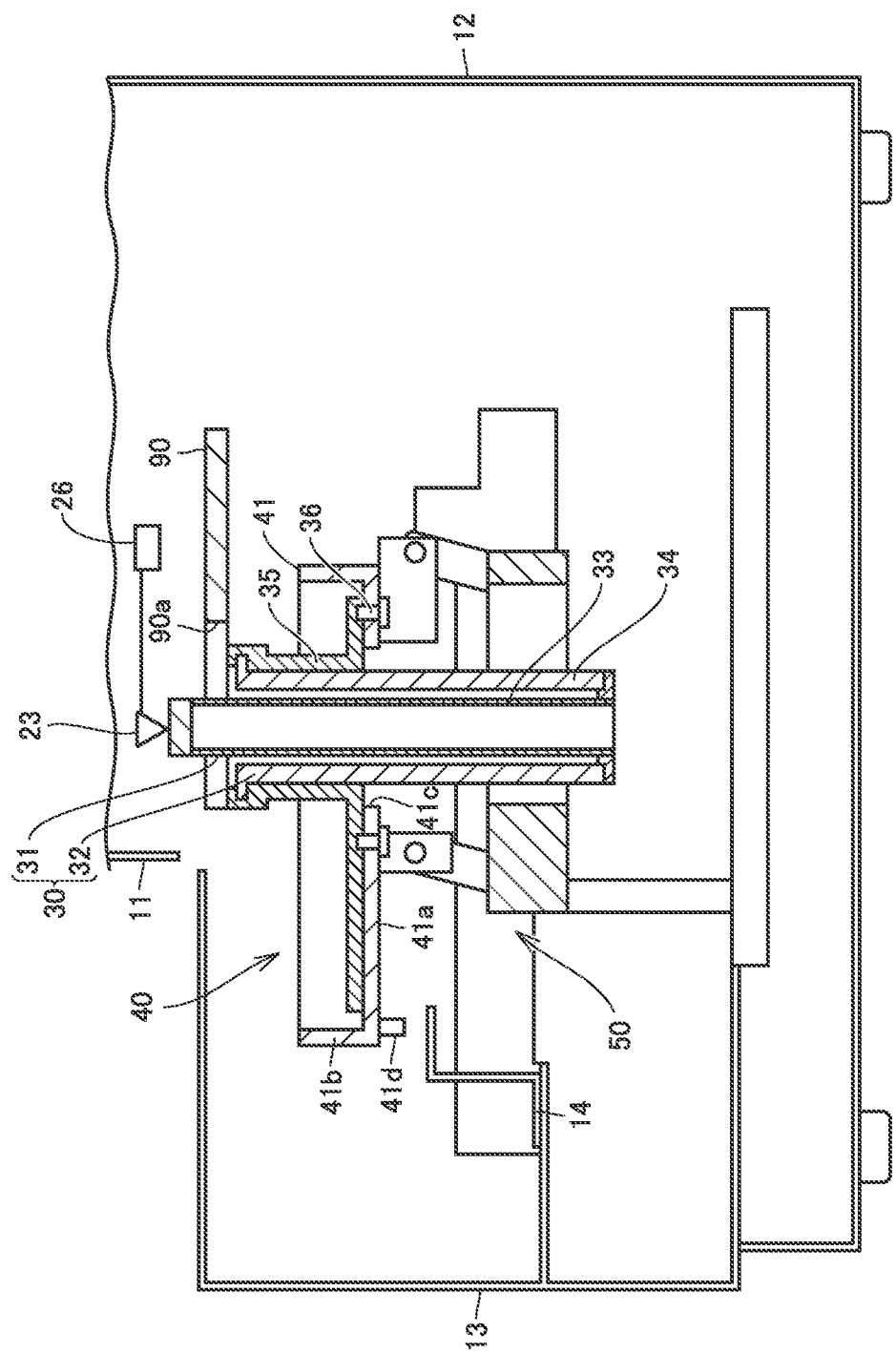
FIG. 4 is a schematic cross-sectional view showing a first state in which the sample stage is positioned at the measurement position in the scanning probe microscope according to the embodiment.
Figure 5:
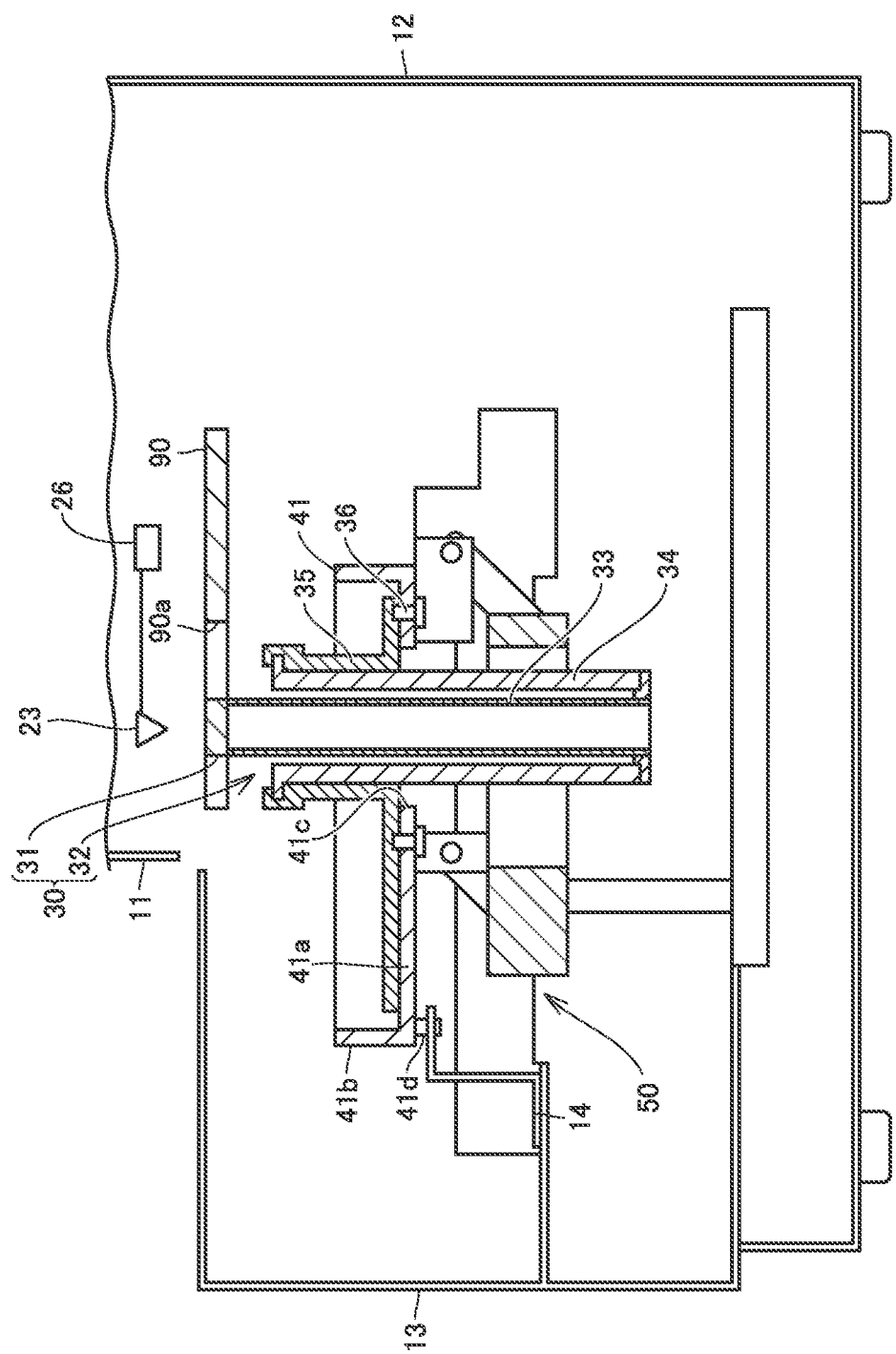
FIG. 5 is a schematic cross-sectional view showing a second state in which the sample stage is positioned at the retracted position in the scanning probe microscope according to the embodiment.
Figure 6:
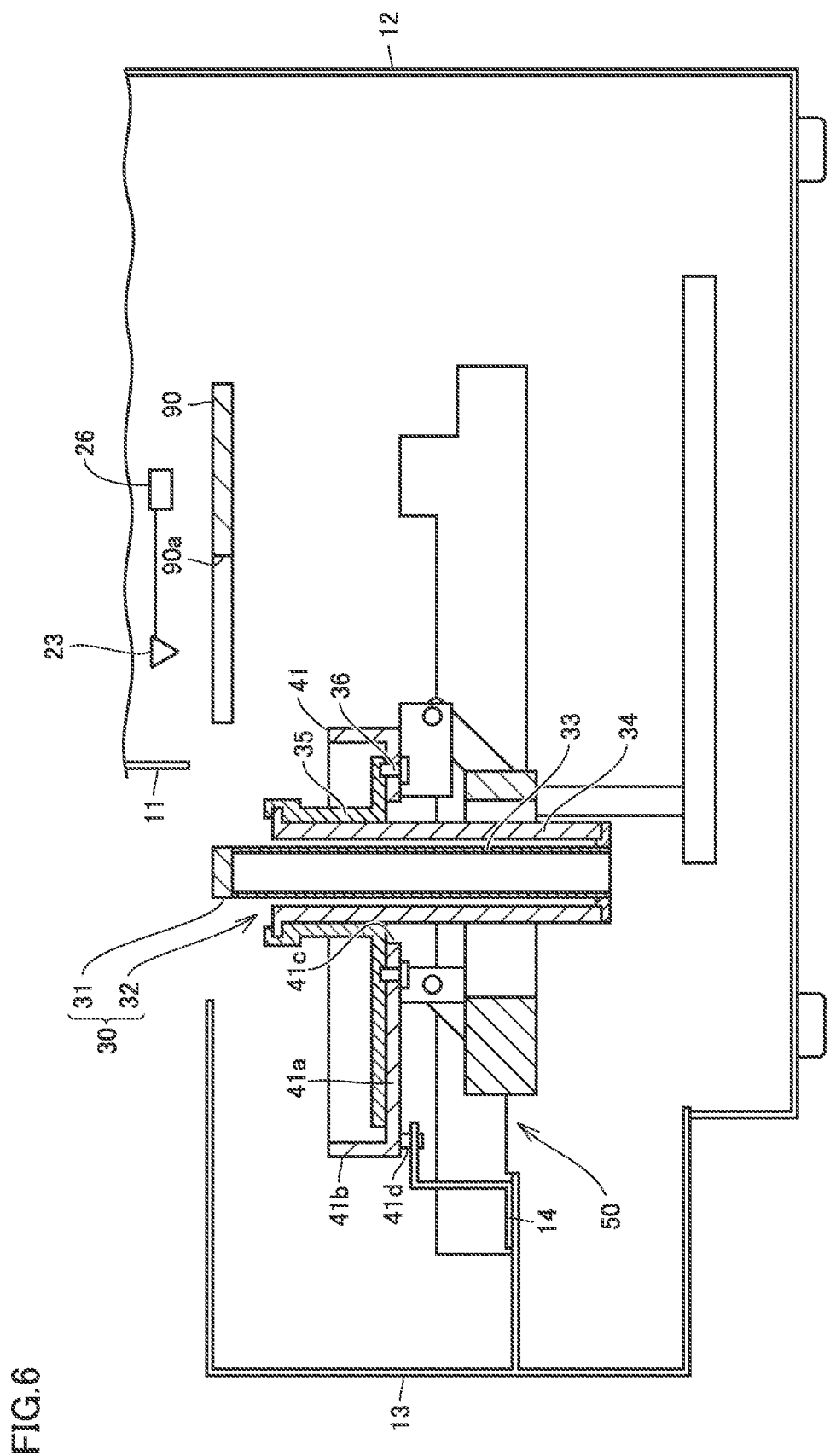
FIG. 6 is a schematic cross-sectional view showing a third state in which the sample stage is positioned at the sample take-out position in the scanning probe microscope according to the embodiment.

FIG. 4 is a schematic cross-sectional view illustrating a first state in which the sample stage is positioned at the measurement position in the scanning probe microscope according to the embodiment. FIG. 5 is a schematic cross-sectional view illustrating a second state in which the sample stage is positioned at the retracted position in the scanning probe microscope according to the embodiment. FIG. 6 is a schematic cross-sectional view showing a third state in which the sample stage is positioned at the sample take-out position in the scanning probe microscope according to the embodiment. Referring to FIG. 4 to FIG. 6, the detailed configuration of the sample stage 30 and the sample stage holding unit 40 and the take-out operation of the sample stage 30 will be described.

As shown in FIG. 4 to FIG. 6, the sample stage holding unit 40 includes a substantially box-shaped configuration opened upward. The sample stage holding unit 40 includes a main body portion 41 and a plurality of legs 42 and 43 (see FIG. 7) which will be described later. The main body portion 41 has a bottom portion 41a, a side wall portion 41b, a through-hole 41c, and an engaging portion 41d.

The bottom portion 41a has a flat plate shape. The side wall portion 41b is provided so as to stand up from the periphery of the bottom portion 41a. At the substantially central portion of the bottom portion 41a, the through-hole 41c is provided. The sample stage 30 is inserted into the through-hole 41c. The engaging portion 41d is provided at the front of the bottom portion 41a so as to protrude downward. The engaging portion 41d is a part that detachably engages with a part of the housing. Specifically, the engaging portion 41d is provided so as to be engaged with the overhang portion 14 provided in the housing.

The sample stage 30 includes a sample placement portion 31 and a scanner 32. The sample placement portion 31 is fixed to the upper end of the scanner 32. The scanner 32 includes a piezo tube 33 and a scanner housing 34. The scanner housing 34 is fixed to the sample stage holding unit 40 by a bracket 35, whereby the sample stage 30 is held by the sample stage holding unit 40. The bracket 35 is fixed to the bottom portion 41a of the sample stage holding unit 40 by a fastening member 36 such as a screw.

As shown in FIG. 4, in the first state in which the sample stage 30 is positioned at the measurement position, the sample stage 30, the sample stage holding unit 40, and the moving mechanism 50 are housed in the housing 10. In this state, the upper portion of the sample stage 30 projects above the plate unit 90. Further, the engaging portion 41d of the sample stage holding unit 40 is arranged so as to face the overhang portion 14 and is in a non-engaged state that is not engaged with the overhang portion 14.

When taking out the sample stage 30 from the first state, initially, the sample stage holding unit 40 is lowered by the moving mechanism 50 so that the sample stage 30 is lowered from the measurement position to the retracted position.

As shown in FIG. 5, even in the second state in which the sample stage 30 is positioned at the retracted position, the sample stage 30, the sample stage holding unit 40, and the moving mechanism 50 are accommodated in the housing 10. On the other hand, in this condition, the sample stage 30 and sample stage holding unit 40 are lowered, so that the upper portion of the sample stage 30 does not protrude above the plate unit 90. That is, when the sample stage 30 and the sample stage holding unit 40 are lowered, the upper end of the sample stage 30 is positioned on the side lower than the measurement unit 20 and the upper housing 11. Further, the engaging portion 41d is in engagement with the engagement hole provided in the overhang portion 14.

Next, the moving mechanism 50 slidably moves the sample stage holding unit 40 forward so that the sample stage 30 moves from the retracted position to the sample take-out position. At this time, since the sample stage moves with respect to the measurement unit 20 with the sample stage lowered, it is possible to prevent the interference between the measurement unit 20 and the sample stage 30. Further, since the engaging portion 41d is engaged, the front portion 13 also slidably moves forward with the sample stage holding unit 40.

As shown in FIG. 6, in the third state in which the sample stage 30 is positioned at the sample take-out position, since the front portion 13 is moved to the front side, the sample stage 30 is exposed from the gap formed between the upper housing 11 and the front portion 13. Thus, it is possible to easily take out the sample.

Note that when another sample is measured after taking out the sample, the sample stage 30 can be moved from the sample take-out position to the measurement position by performing the opposite operation.

Figure 7:
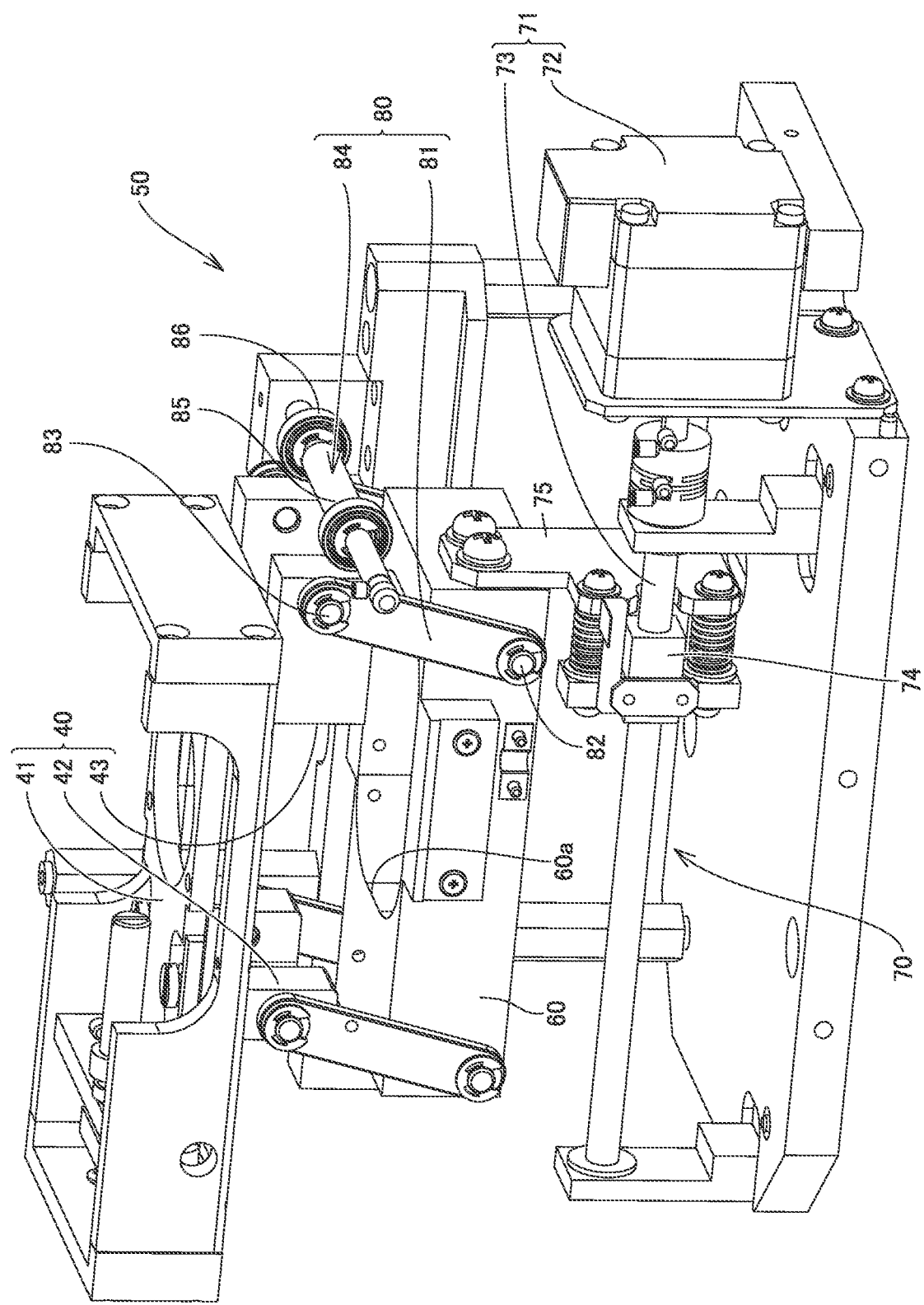
FIG. 7 is a perspective view showing a part of the sample stage holding unit and the moving mechanism according to the embodiment.

FIG. 7 is a perspective view showing a part of the sample stage holding unit and the moving mechanism according to the embodiment. Referring to FIG. 7, the detailed configuration of the moving mechanism 50 according to the embodiment will be described.

As shown in FIG. 7, the moving mechanism 50 includes a support 60, a slide mechanism 70, and a lifting and lowering mechanism 80.

The support 60 supports the sample stage holding unit 40. The support 60 is arranged below the sample stage holding unit 40. The support 60 has a substantially rectangular parallelepiped shape. A through-hole 60a is provided at the center of the support 60 so that the sample stage holding unit 40 penetrates.

The slide mechanism 70 moves the support 60 along the slide direction in which the sample stage holding unit 40 is slidably moved. The slide mechanism 70 includes a drive mechanism 71, a moving body 74, and a fixing portion 75.

The drive mechanism 71 has a motor 72 and a rotation shaft 73. When the motor 72 is driven, the rotation shaft 73 is rotated. As the rotation shaft 73, for example, a ball screw can be adopted.

The moving body 74 moves along the rotation shaft direction of the rotation shaft 73 by the rotating of the rotation shaft 73. The rotation axis of the rotation shaft 73 is arranged parallel to the front and rear direction. When the rotation shaft 73 is rotated forward, the moving body 74 is moved toward the front. When the rotation shaft 73 is reversed, the moving body 74 is moved backward.

The fixing portion 75 fixes the moving body 74 and the support 60. Thus, as the moving body 74 moves, the support 60 also moves together with the moving body 74.

The lifting and lowering mechanism 80 lifts and lowers the sample stage holding unit 40 with respect to the support 60. The lifting and lowering mechanism 80 includes a connecting member 81 and a lifting and lowering guide 84.

The connecting member 81 connects the support 60 and the sample stage holding unit 40. Four connecting members 81 are provided. Two connecting members 81 are connected to the left and right side of the front portion of the support 60, and two connecting members 81 are connected to the left and right sides of the rear portion of the support 60.

One end of the connecting member 81 is pivotally supported by the support 60 so that the connecting member 81 is rotatable about the first rotation shaft 82. The first rotation shaft 82 is orthogonal to the above-described slide direction (forward and backward direction) and the lifting and lowering direction (vertical direction). That is, the first rotation shaft 82 is parallel to the lateral direction.

The other end of the connecting member 81 is pivotally supported by the sample stage holding unit 40 so that the connecting member 81 is rotatable about the second rotation shaft 83. The second rotation shaft 83 is parallel to the first rotation shaft 82. The second rotation shaft 83 is positioned behind and above the first rotation shaft 82.

The lifting and lowering guide 84 guides the movement of the sample stage holding unit 40 in the lifting and lowering direction. The lifting and lowering guide 84 restricts the movement of the sample stage holding unit 40 from the sample take-out position toward the retracted position in the retracting direction (backward) during the lifting and lowering operation of the sample stage holding unit 40.

The lifting and lowering guide 84 includes a rotation shaft 85 and a roller 86. The rotation shaft 85 is parallel to the first rotation shaft 82. The rotation shaft 85 is positioned behind the second rotation shaft 83. The roller 86 is provided so as to be rotatable about the second rotation shaft 83. The rotation shaft 85 is fixed so as not to slidably move in the slide direction.

The sample stage holding unit 40 includes a main body portion 41 and a plurality of legs 42, 43. The plurality of legs 42, 43 is provided so as to project downwardly from the main body portion 41. The plurality of legs 42 is provided on the front side, and the plurality of legs 43 is provided on the rear side.

In the moving mechanism 50 configured as described above, as will be described above, it is provided such that the support 60 can move in a predetermined slide section S (see FIG. 10) including the first section S1 (see FIG. 9) and the second section S2 (see FIG. 10) which are continuous. In conjunction with the movement of the support 60 in the first section S1, the sample stage holding unit 40 is lifted and lowered by the lifting and lowering mechanism 80. As the support 60 is moved in the second section S2, the sample stage holding unit 40 is slidably moved along the slide direction together with the support 60.

This allows the switching between the lifting and lowering movement and the slide movements of the sample stage holding unit 40 by the slide section of support 60. Since the sample stage holding unit 40 can be appropriately moved by continuously slidably moving the sliding support 60 in the predetermined slide section S, the operation control can be easily performed.

The movement of the support 60 and the movement of the sample stage holding unit 40 will be described below with reference to FIG. 8 to FIG. 10.

Figure 8:
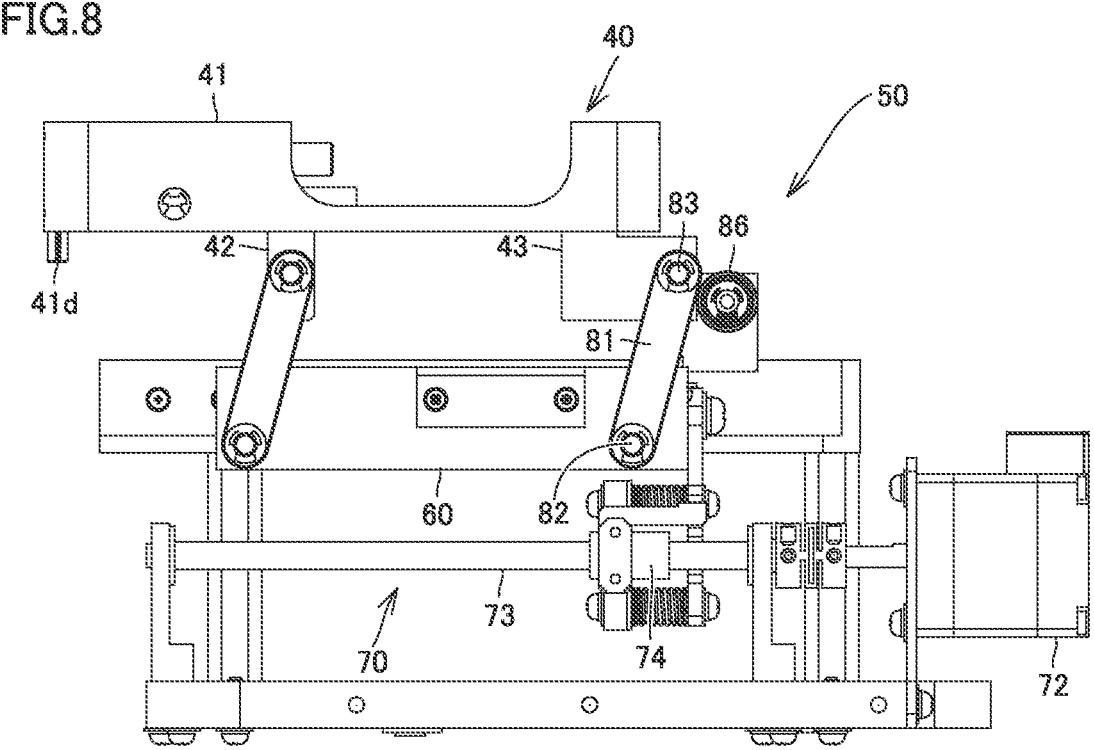
FIG. 8 is a plan view showing a part of the sample stage holding unit and the moving mechanism in the first state shown in FIG. 4.

FIG. 8 is a plan view showing a part of the sample stage holding unit and the moving mechanism in the first state shown in FIG. 4. As shown in FIG. 8, in the first state, the inclination angle of the connecting member 81 (the smaller angle among the angles formed by the extending direction of the connecting member 81 and the slide direction) is increased, and a plurality of legs 42 and 43 are spaced apart from the support 60.

Further, the rear surfaces of the plurality of legs 43 abut against the roller 86, and the movement of the sample stage holding unit 40 is restricted.

Further, when the support 60 is moved forward from this state, the one end of the connecting member 81 moves forward while the movement of the connecting member 81 backward is restrained. Thus, the connecting member 81 is rotated about the first rotation shaft and the second rotation shaft so that the other end of the connecting member 81 moves downward. That is, the inclination angle of the connecting member 81 becomes smaller. As a result, the sample stage holding unit 40 is lowered. When the sample stage holding unit 40 is lowered, the roller 86 rotates and the lowering of the sample stage holding unit is also guided. When lifting the sample stage holding unit 40, an operation opposite to the above is performed.

By pivotally supporting the connecting members 81 so that the posture (inclination angle) can be changed to lift and lower the sample stage holding unit 40, it is possible to simplify the lifting and lowering mechanism 80. Further, by rotating the roller 86 when the sample stage holding unit 40 is lifted and lowered, the friction between the lifting and lowering guide 84 and the sample stage holding unit 40 can be reduced.

Figure 9:
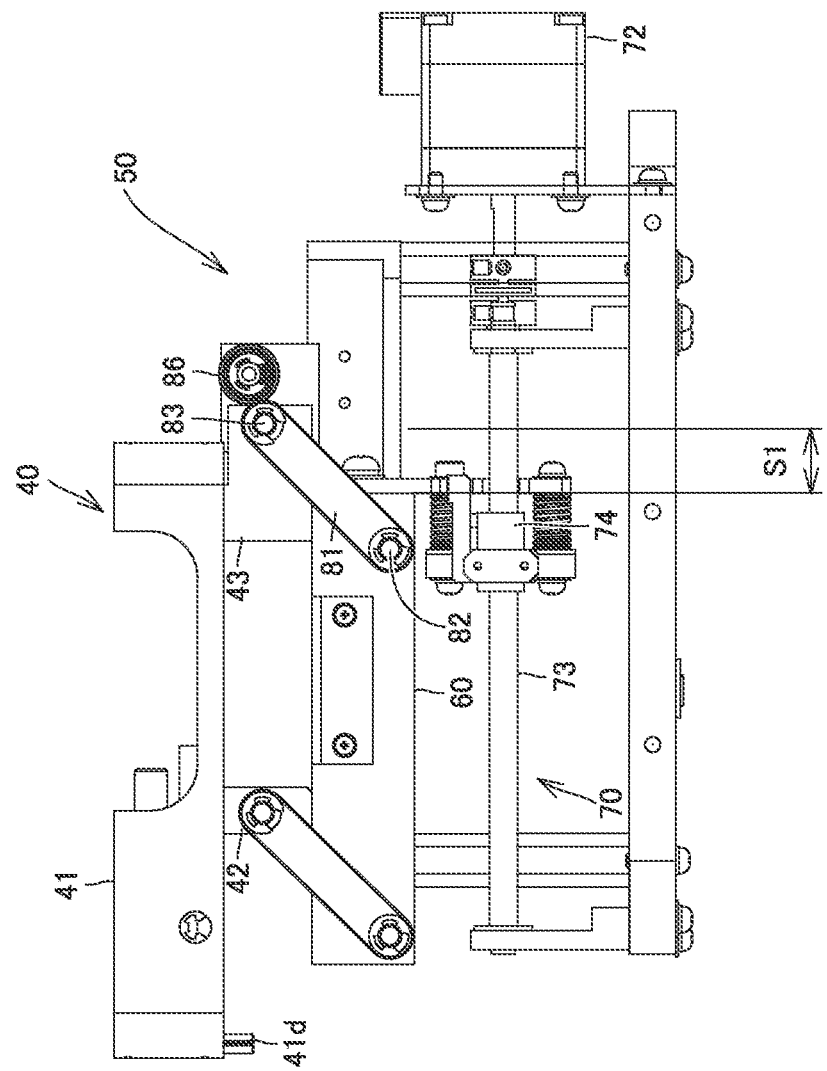
FIG. 9 is a plan view showing a part of the sample stage holding unit and the moving mechanism in a second state shown in FIG. 4.

FIG. 9 is a plan view showing a part of the sample stage holding unit and the moving mechanism in the second state shown in FIG. 4. As shown in FIG. 9, when the support 60 is moved from the first state in the first section S1, the sample stage holding unit 40 is lowered, so that the plurality of legs 42 and 43 abut against the support 60. As a result, the lowering of the sample stage holding unit 40 is regulated, and the sample stage 30 is positioned at the retracted position. In this condition, the attitude (inclination angle) of the connecting member 81 is maintained constant.

As described above, the support 60 serves as a regulation means for regulating the lowering of the sample stage holding unit 40. Note that the lifting of the sample stage holding unit 40 is limited by the abutment of the sample stage holding unit 40 against the plate unit 90 arranged above it. Thus, by providing the function of the plate unit 90 and the support 60 as a regulation means, while reducing the number of components, it is possible to limit the lifting range of the sample stage holding unit with a simple configuration.

By further slidably moving the support 60 forward from the second state, the sample stage holding unit 40 is slidably moved forward together with the support 60 while maintaining the constant height position. At this time, the sample stage 30 also is slidably moved forward together with the sample stage holding unit 40.

Figure 10:
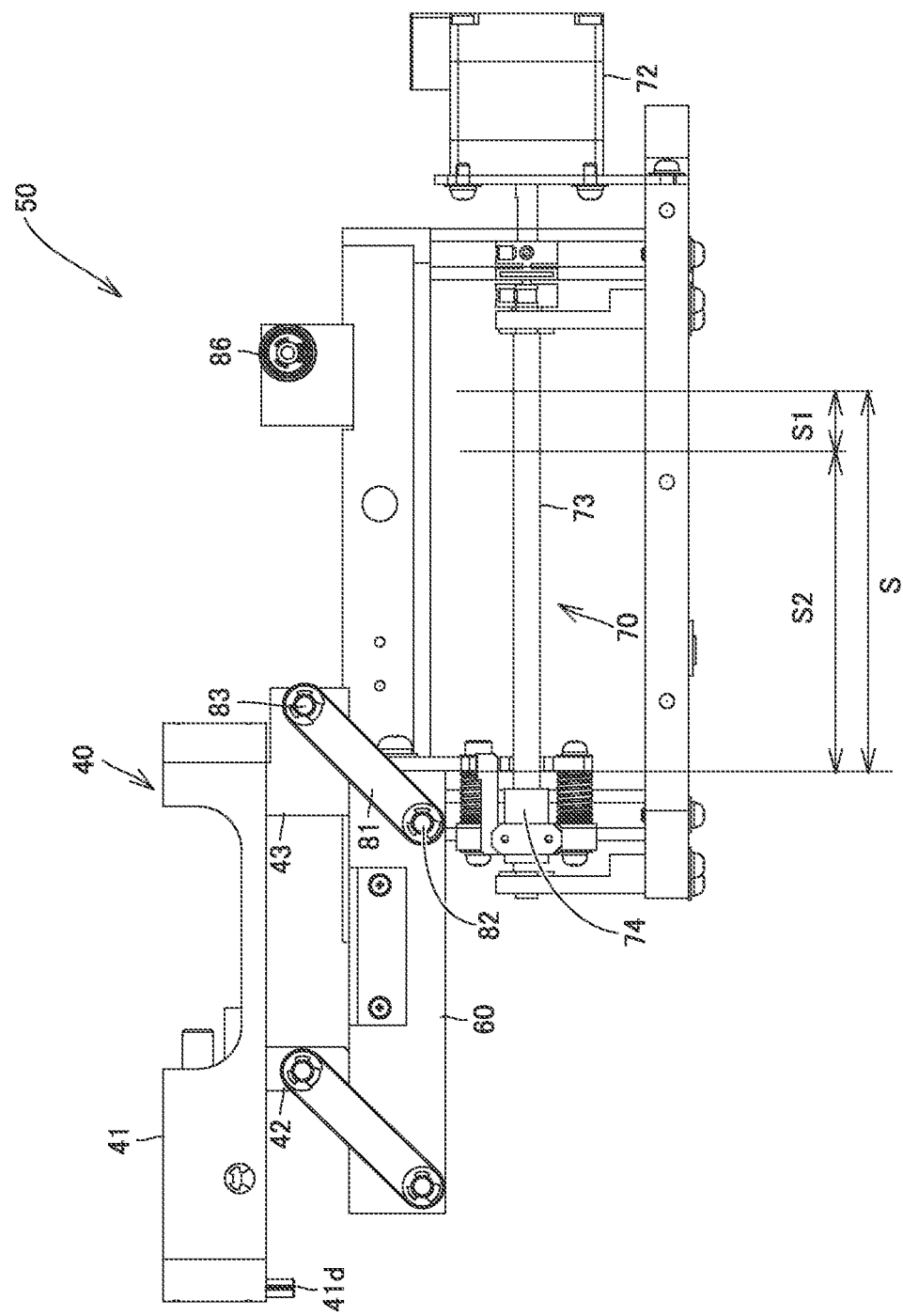
FIG. 10 is a plan view showing a part of the sample stage holding unit and the moving mechanism in a third condition shown in FIG. 4.

FIG. 10 is a plan view showing a part of the sample stage holding unit and the moving mechanism in the third condition shown in FIG. 4. As shown in FIG. 10, when the support 60 is moved from the second state in the second section S2, the sample stage 30 fixed to the sample stage holding unit 40 is moved to the sample take-out position.

Figure 11:
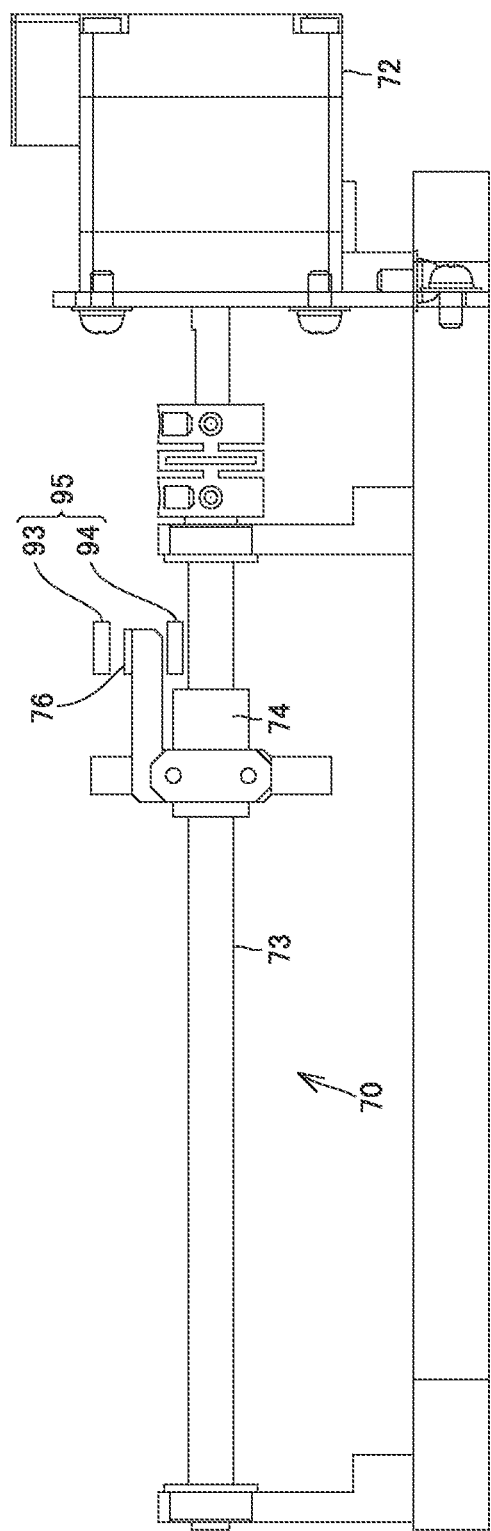
FIG. 11 is a diagram for explaining a detection device according to the embodiment.

FIG. 11 is a diagram for explaining the detection device according to the embodiment. Referring to FIG. 11, a detection device 95 according to this embodiment will be described.

As shown in FIG. 11, the scanning probe microscope 1 is provided with a detection device 95. The detection device 95 detects the position of the support 60. Specifically, the detection device 95 detects whether or not the support 60 is positioned at one end in a predetermined slide section S from the sample take-out position to the retracted position when the support 60 moves in the predetermined slide section S in the retracting direction.

The detection device 95 includes a light-emitting unit 93 and a light-receiving unit 94 for receiving the light emitted from the light-emitting unit 93. The light-emitting unit 93 and the light-receiving unit 94 are arranged to face in the vertical direction. The slide mechanism 70 includes a light-shielding member 76 that slidably moves in accordance with the slidable movement of the support 60.

The detection device 95 detects the position of the support 60 by blocking the light emitted from the light-emitting unit 93 toward the light-receiving unit 94 by the light-shielding member 76. The light-shielding member 76 is provided so as to shield the light when the support 60 is positioned at one end of the predetermined slide section S.

As described above, in the scanning probe microscope 1 according to this embodiment, the moving mechanism 50 lifts and lowers the sample stage holding unit 40 so that the sample stage 30 is lifted and lowered between the retracted position and the measurement position positioned below the measurement position, and slidably moves the sample stage holding unit 40 so that the sample stage 30 is moved between the sample take-out position and the retracted position.

Thus, when taking out the sample, the sample stage 30 can be slidably moved after the sample stage 30 is retracted downward with respect to the measurement unit 20. On the other hand, when setting the ample, the reverse operation is performed. As described above, when the sample stage 30 is slidably moved, the sample stage 30 is moved downward in a state in which the sample stage 30 is lowered with respect to the measurement unit 20. Therefore, the measurement unit 20 and the sample stage 30 can be prevented from interfering with each other.

The sample stage 30 can be moved between the measurement position and the sample take-out position by moving the sample stage holding unit 40 without moving the measurement unit 20. Therefore, as compared with the configuration in which the measurement unit 20 is moved to take out the sample and the configuration in which the measurement unit 20 is removed to take out the sample, it is possible to suppress the fluctuation of the position of the measuring instrument (optical displacement system) included in the measurement unit 20. Further, since the operation of the detaching measurement unit 20 is not necessary, it is possible to reduce the work load and the work time when the sample is taken out. In addition, by providing a sample take-out position at a position that does not overlap with the measurement unit 20 in the vertical direction, it is possible to secure a sufficient working space, thereby improving the workability.

The embodiment invented this time is exemplified in all respects and is not restrictive. The scope of the present invention is indicated by the claims, and includes all modifications within the meanings and ranges equivalent to those of the claims.

DESCRIPTION OF SYMBOLS

1: Scanning probe microscope
10: Housing
11: Upper housing
12: Lower housing
13: Front portion
14: Overhang portion
20: Measurement unit
21: Head portion
21a: Opening
22: Holder
23: Cantilever
24: Imaging unit
25: Base unit
26: Cantilever drive unit
30: Sample table
31: Placement portion
32: Scanner
33: Piezo tube
34: Scanner housing
35: Bracket
36: Fastening member
40: Sample stage holding unit
41: Main body portion
41a: Bottom portion
41b: Side wall portion
41c: Through-hole
41d: Engaging portion
42, 43: Leg
45: Drive mechanism
50: Moving mechanism
60: Support
60a: Through-hole
70: Slide mechanism
71: Drive mechanism
72: Motor
73: Rotation shaft
74: Moving body
75: Fixing portion
76: Light-shielding member
80: Lifting and lowering mechanism
81: Connecting member
82: First rotation axis 83: Second rotation axis
84: Lifting and lowering guide
85: Rotation shaft
86: Roller
90: Plate unit
90a: Cut-out portion
93: Light-emitting unit
94: Light-receiving unit
95: Detection device

The invention claimed is:

1. A surface analysis device for analyzing a sample surface, comprising:
a sample stage configured to place a sample thereon;
a measurement unit including a cantilever to be arranged to face the sample stage and a cantilever drive unit for driving the cantilever; and
a drive mechanism configured to relatively displace the measurement unit and the sample stage,
wherein the drive mechanism is configured, when taking out the sample stage, to shift the sample stage relative to the measurement unit so that the measurement unit and the sample stage separate from each other in a first direction in which the cantilever and the sample stage face each other, and then slidably move the sample stage in a second direction intersecting with the first direction,
wherein the drive mechanism includes a sample stage holding unit for holding the sample stage and a moving mechanism for moving the sample stage between a measurement position and a sample take-out position,
wherein the first direction is a vertical direction,
wherein the moving mechanism is configured to lift and lower the sample stage holding unit so that the sample stage is lifted and lowered between the measurement position and a retracted position positioned lower than the measurement position and slidably move the sample stage holding unit so that the sample stage is moved between the sample take-out position and the retracted position,
wherein the surface analysis device further comprises a housing configured to accommodate the sample stage, the sample stage holding unit, and the moving mechanism in a state in which the sample stage is positioned at the measurement position, and
wherein when the sample stage holding unit is slidably moved so that the sample stage is moved from the retracted position to the sample take-out position, the sample stage is exposed to an outside from an inside of the housing.

2. The surface analysis device as recited in claim 1,
wherein the moving mechanism includes a support for supporting the sample stage holding unit, a slide mechanism for slidably moving the support along a slide direction in which the sample stage holding unit is slidably moved, and a lifting and lowering mechanism for lifting and lowering the sample stage holding unit relative to the support,
wherein the support is movably provided in a predetermined slide section including a first section and a second section, the first section and the second section being continuous,
wherein the sample stage holding unit is lifted and lowered with respect to the support by the lifting and lowering mechanism in conjunction with a slide movement of the support in the first section, and
wherein the sample stage holding unit is slidably moved along the slide direction together with the support in accordance with a slide movement of the support in the second section.

3. The surface analysis device as recited in claim 2,
wherein the lifting and lowering mechanism includes a connecting member for connecting the support and the sample stage holding unit, and a lifting and lowering guide for guiding a movement of the sample stage holding unit in a lifting and lowering direction,
wherein one end side of the connecting member is pivotally supported by the support so that the connecting member is rotatable about a first rotation axis perpendicular to the slide direction and the lifting and lowering direction,
wherein the other end side of the connecting member is pivotally supported by the sample stage holding unit so that the connecting member is rotatable about a second rotation axis parallel to the first rotation axis,
wherein the lifting and lowing guide restricts a movement of the sample stage holding unit in a retracting direction from the sample take-out position toward the retracted position when the support is moved in the first section, and
wherein the support is slidably moved in the first section in a regulated state in which the movement of the sample stage holding unit in the retracting direction by the lifting and lowering guide to rotate the connecting member about the first rotation axis and the second rotation axis, thereby lifting and lowering the sample stage holding unit relative to the support.

4. The surface analysis device as recited in claim 3,
wherein the lifting and lowing guide includes a roller rotatable about a rotation shaft parallel to the first rotation axis, and
wherein the sample stage holding unit comes into contact with the roller to cause the regulated state, and the roller rotates in the regulated state to guide lifting and lowering of the sample stage holding unit.

5. The surface analysis device as recited in claim 2,
wherein the lifting and lowering mechanism includes a plate unit arranged above the sample stage holding unit so as not to interfere with the sample stage,
wherein the support is arranged below the sample stage holding unit,
wherein when the sample stage holding unit comes into contact with the plate unit, lifting of the sample stage holding unit is regulated, and
wherein when the sample stage holding unit comes into contact with the support, lowering of the sample stage holding unit is regulated.

6. The surface analysis device as recited in claim 2, further comprising:
a detection device configured to detect a position of the support,
wherein the detection device includes a light-emitting unit and a light-receiving unit for receiving light emitted from the light-emitting unit,
wherein the slide mechanism includes a light-shielding member that is slidably moved in accordance with the slide movement of the support, and
wherein the detection device detects a position of the support when the light emitted from the light-emitting unit toward the light-receiving unit is shielded by the light-shielding member.

7. The surface analysis device according to claim 1,
wherein a part of the housing is configured to be slidable, wherein the sample stage holding unit includes an engaging portion capable of being releasably engaged with the part of the housing, wherein the engaging portion is in a non-engaged state in which the engaging portion is not engaged with the part of the housing in a state in which the sample stage holding unit is lifted so that the sample stage is positioned at the measurement position, and is in an engaged state in which the engaging portion is engaged with the part of the housing in a state in which the sample stage holding unit is lowered so that the sample stage is positioned at the retracted position, and wherein in the engaged state, when the sample stage holding unit is slidably moved so that the sample stage is moved from the retracted position to the sample take-out position, the part of the housing is slidably moved integrally with the sample stage holding unit to expose the sample stage to an outside from an inside of the housing.

* * * * *